United States Patent
Soda (10) Patent No.: US 6,359,908 B1
(45) Date of Patent: Mar. 19, 2002

(54) FRAME SYNCHRONOUS CIRCUIT CONTRIBUTING TO SDH SIGNAL

(75) Inventor: Masaaki Soda, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/136,380

(22) Filed: Aug. 19, 1998

(30) Foreign Application Priority Data

Aug. 21, 1997 (JP) .............................. 9-239124

(51) Int. Cl.[7] .............................. H04L 7/08; H04J 3/06
(52) U.S. Cl. ..................... 370/503; 370/509; 370/514
(58) Field of Search ................ 370/503, 509, 370/514

(56) References Cited

U.S. PATENT DOCUMENTS

| | | | | |
|---|---|---|---|---|
| 5,710,774 A | * | 1/1998 | Suh et al. ................. | 370/513 |
| 5,963,602 A | * | 10/1999 | Aoki et al. ................. | 375/354 |
| 6,104,770 A | * | 8/2000 | Yama ......................... | 375/368 |

FOREIGN PATENT DOCUMENTS

JP          8-163116       6/1996

* cited by examiner

Primary Examiner—Melvin Marcelo
(74) Attorney, Agent, or Firm—Ostrolenk, Faber, Gerb & Soffen, LLP (57) ABSTRACT

A frame synchronous circuit enables a frame synchronization in relation to high speed SDH (Synchronous Digital Hierarchy) signal to be realized with simple constitution. A shift register which performs serial-parallel conversion of an STM-N (Synchronous Transport Module-N (=1, 2, 3, . . . )) signal by 1-byte unit, is in use by way of shift registers 4, and 7 with parallel configuration inputting data alternately in every 1-bit, thus enabling sufficient time for processing operation of the data to be secured. Appearance of A1-byte on two shift registers can be generated by way of two kinds of patterns of output positions which are shifted by one bit with each other caused by input order toward the shift register. Thereby, when the A1-byte detecting circuit 6 detects the A1-byte at an inappropriate output position, slowing the STM-N signal by 1 bit at the 1-bit delay circuit in order to reverse the input order such that the A1-byte is detected at the normal output position. Subsequently, the counter 3 with 1-byte cycle which causes the latched-circuits 5, and 8 to operate is reset so as to output parallel data with 1-byte unit by adjusting to the detecting timing (phase).

10 Claims, 7 Drawing Sheets

TYPE1

TYPE2

FIG. 7

FRAME SYNCHRONOUS CIRCUIT CONTRIBUTING TO SDH SIGNAL

BACKGROUND OF THE INVENTION

The present invention relates to a frame synchronous circuit in terms of time-division multiplex signal. More to particularly this invention relates to a frame synchronous circuit contributing to SDH signal.

Description of the Related Art

In ITU-T (International Telecommunication Unions International Telecommunication Standardization Department), an interface within network is standardized under the name of SDH-NNI (Synchronous Digital Hierarchy Network Node Interface) by way of purpose of an improvement for operation of a network. Under the state of things, STM-N (Synchronous Transport Module-N ; N=1, 2, 3, . . . ) signal is established by way of signal which N pieces of STM-1 frame construction is subjected to byte multiplexing.

Under normal conditions, in order to perform a frame synchronization of the STM-N signal, the action of frame synchronization is performed while detecting A1, A2 byte-pattern for frame synchronization existing within SOH (Section Overhead) of the STM-N signal.

In the Japanese Patent Application Laid-Open No. HEI 8-163116, an example in which quantity of hardware is intended to stay as few as possible is described by way of the conventional frame synchronous circuit.

Figure 1:
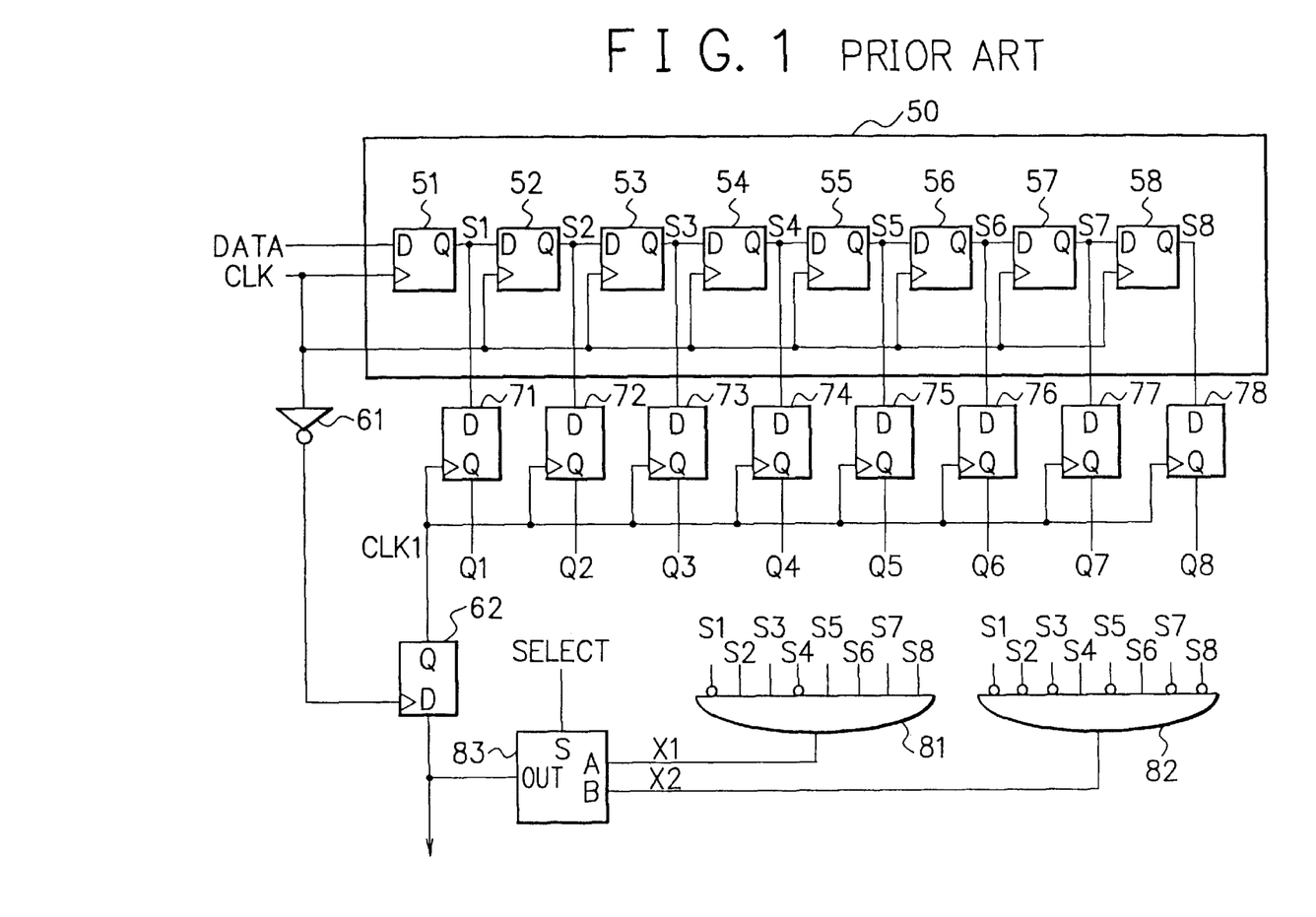
FIG. 1 is a view showing a conventional technology.

FIG. 1 is a view showing configuration of a frame synchronous circuit described in the official gazette of the above Application No. HEI 8-163116. In FIG. 1, a reference numeral 50 denotes a shift register for converting a serial data DATA of input into parallel data, reference numerals 51–58 denote D-type flip-flop (D-F/F) constituting the shift register, reference numerals 71–78 denote D-F/F for taking data with the timing of clock CLK1 from the serial-parallel converter, reference numerals 81, and 82 denote AND gate for detecting respective A1 byte-pattern and A2 byte-pattern with output of respective stages of the shift register 50 as the input, a reference numeral 83 denotes a selector for selecting detection signal of the AND gates 81 and 82, and reference numerals 61, and 62 denote an inverter and a D-F/F for supplying the fan out of the selector 83 to the D-F/Fs 71 to 78 with the timing which is shifted by half cycle in relation to input clock CLK.

In this frame synchronous circuit, which causes verification to be performed whether or not the pattern of data of the shift register 50 is A1-byte. If the state of selector 83 is set so as to select the output of AND gate 81, when the data inputted to the shift register 50 comes to be A1-byte, the logic of output of the AND gate 81 due to the data pattern becomes "1", thus this is outputted from the selector 83. Under the state, the D-F/F 62 outputs the logic "1" to generate the clock CLK 1 with the timing of the clock CLK from the inverter 61. The D-F/Fs 71 to 78 take in data of the shift register 50 with leading edge of the clock CLK1 in parallel. Subsequently, the data is read with this timing, thus the signal which a phase of byte unit corresponds therewith being outputted.

In the above described conventional frame synchronous circuit, the synchronous operation from detection of A1-byte until generation of the clock CLK should be terminated within one time slot of input clock CLK. If the speed of input data is slow, such circuit system is in use sufficiently. However, in the case of high speed data such as STM-64, even if circuit is arranged by bipolar device of the highest speed, the time to require from detection of A1-byte until generation of the clock CLK 1 takes more than 1 time slot, thereby it becomes difficult to perform timing control of generation of the clock CLK 1, with the result that there is the problem that the frame synchronization does not materialize.

SUMMARY OF THE INVENTION

In view of the foregoing it is an object of the present invention to provide a frame synchronous circuit which has a simple configuration and which is capable of operating certainly in relation to the high speed SDH signal.

In one arrangement to be described below by way of example in illustration of the invention, a frame synchronous circuit includes a first and a second shift registers for inputting an SDH (Synchronous Digital Hierarchy) signal alternately in every 1 bit, a first and a second A1-byte detecting logic device for detecting an A1-byte from respective inputs which are inputted thereto by way of two sets of outputs for 1 byte which are shifted with each other by 1 bit, from among respective outputs of the first and the second shift registers, a latched-circuit for latching to output data with 1 byte as a unit from output of the first and the second shift registers while synchronizing with detected output of the first A1-byte detecting logic device, and a switching circuit for switching data input order of the SDH signal inputted to the first and the second shift registers by virtue of detected output of the second A1-byte detecting logic device.

In one particular arrangement to be described in illustration of the present invention, by way of example, wherein the switching circuit comprises 1-bit shift circuit for performing 1-bit shift of the SDH signal of detected output of the second A1-byte detecting logic device.

In one yet particular arrangement to be described in illustration of the present invention, by way of example, wherein there is provided a counter circuit for controlling latching of the latched-circuit by 1-byte cycle of the SDH signal with detected output of the first A1-byte detecting logic device as set input of determined value.

In another arrangement to be described below by way of example in illustration of the present invention, a frame synchronous circuit includes a delay circuit which is capable of outputting data slowed by 1-bit in relation to input data by selection signal, a frequency division circuit for frequency dividing input clock by ½, a first and a second shift register circuits for shifting data successively by using frequency division clock signal of the frequency dividing circuit while inputting output signal of the delay circuit, a counter circuit for performing counter operation by inputting frequency division clock signal of the frequency dividing circuit and the counter circuit which is capable of setting the counter to a determined value by virtue of set signal, an A1-byte detecting circuit to which data of determined bit number shifted from output of the first and the second shift registers by 1-bit each other is inputted, detecting the A1-byte of the SDH (Synchronous Digital Hierarchy) frame, and outputting respective detected outputs by way of selection signal of the delay circuit and set signal of the counter circuit, and a first and a second latched-circuit to which the output of the first and the second shift registers is inputted to perform latching by the output signal of the counter circuit.

In one particular arrangement to be described below by way of example in illustration of the invention, wherein the first shift register comprises a first flip-flop for latching an input data at trailing edge of a frequency division clock signal and for maintaining signal from the time point of latching until leading edge of next frequency division clock signal, and a second to a fourth flip-flops for latching an input data at leading edge of a frequency division clock signal and for maintaining data from the time point of latching until next leading edge of the frequency division clock signal, and wherein the second shift register comprises a first to a fifth flip-flops for latching input data at leading edge of the frequency division clock signal and for maintaining data from the time point of latching until next leading edge of the frequency division clock signal.

In one yet particular arrangement to be described below by way of example in illustration of the present invention, wherein the A1-byte detecting circuit comprises a first logic gate circuit for outputting the selection signal with both outputs of the first to fourth flip-flops of the first shift register and the first to fourth flip-flops of the second shift register as input, and a second logic gate circuit for outputting the set signal with both outputs of the first to fourth flip-flops of the first shift register and the second to fifth flip-flops of the second shift register as input.

In yet particular arrangement to be described below by way of example in illustration of the present invention, wherein the delay circuit comprises a first flip-flop for implementing latching with clock signal of SDH while inputting the SDH signal, a second flip-flop for implementing latching with the clock signal while inputting the output signal of the first flip-flop, a flip-flop whose output becomes always ON when selection signal is once inputted, and a selector circuit for selecting to output either output signal of the first flip-flop or output signal of the second flip-flop.

In another particular arrangement to be described below by way of example in illustration of the present invention, wherein the A1-byte detecting circuit comprises a flip-flop for implementing latching of output of the second logic gate circuit by frequency division clock of the frequency dividing circuit.

As stated above, the frame synchronous circuit according to the invention enables sufficient time for operation of the timing circuit in order to materialize synchronization to be increased, by the fact that it causes the STM-N signal with ½ frequency division clock of input clock to be inputted alternately in every bit to two parallel shift registers. Appearance of A1-byte on two shift registers can be generated by way of two kinds of patterns of output positions which are shifted by one bit with each other caused by input order toward the shift register. Thereby, for instance when the A1-byte detecting circuit detects the A1-byte at an inappropriate output position, slowing the STM-N signal by 1 bit at the 1-bit delay circuit in order to reverse the input order such that the A1-byte is detected at the normal output position. Subsequently, the counter with 1-byte cycle which causes the latched-circuits to operate is reset so as to output parallel data with 1-byte unit by adjusting to the detecting timing (phase).

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENT

Figure 2:
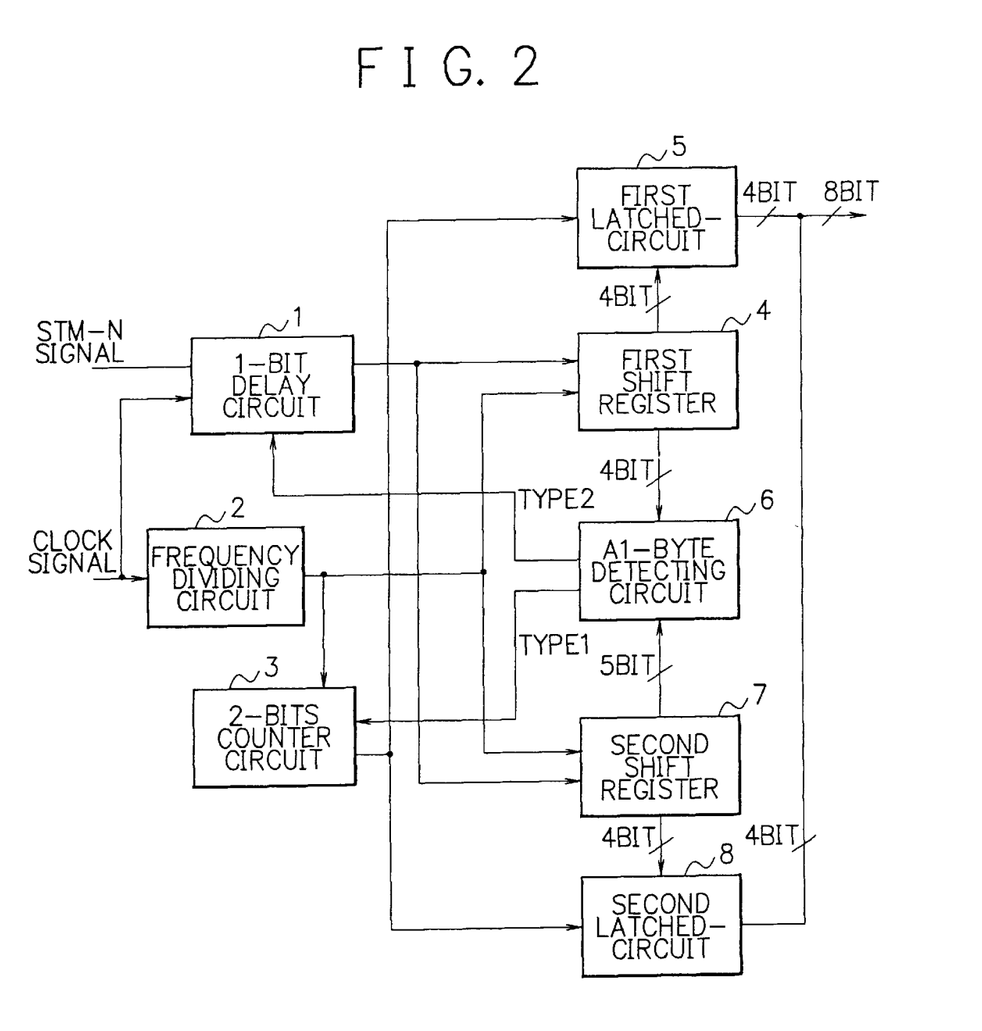
FIG. 2 is a view showing one embodiment of the present invention.

A preferred embodiment of the present invention will now be described in detail referring to the accompanying drawings. FIG. 2 is a view showing a frame synchronous circuit of the present embodiment.

A whole constitution of the present frame synchronous circuit comprises a first and a second shift registers 4, and 7 in which two shift registers for outputting the STM-N signal by the byte unit has two piece parallel constitution, a ½-frequency dividing circuit 2 which outputs clock for inputting the STM-N signal to the respective shift registers 4, and 7 alternately in every one bit, a 1-bit delay circuit 1 for performing switching control of input order of the STM-N signal for the respective shift registers 4, and 7, an A1-byte detection circuit which inputs a parallel data from the respective shift registers 4, and 7 to detect the A1-byte, a first and a second latched-circuits 5, and 8 for outputting the STM-N data of the respective shift registers 4, and 7 by the byte unit in parallel, and 2-bits counter circuit 3 which outputs the clock for performing latching operation of the respective latched-circuits 5, and 8 by the byte unit.

Next, there will be described configuration and operation of respective sections of the present frame synchronous circuit.

The 1-bit delay circuit 1 to which the STM-N signal and the clock signal (STM-N clock) of bit rate thereof are inputted, outputs the STM-N signal to the first and the second shift registers 4, and 7. The 1-bit delay circuit 1, when Type-2 signal (describe later) which comes to be ON (for instance logic "1") at the time when the A1-byte detection circuit 6 receives the pattern of incorrect A1-byte comes to be ON-state, outputs bit-string of the STM-N signal after 1-bit -delay (1 cycle) from the time point.

Figure 3:
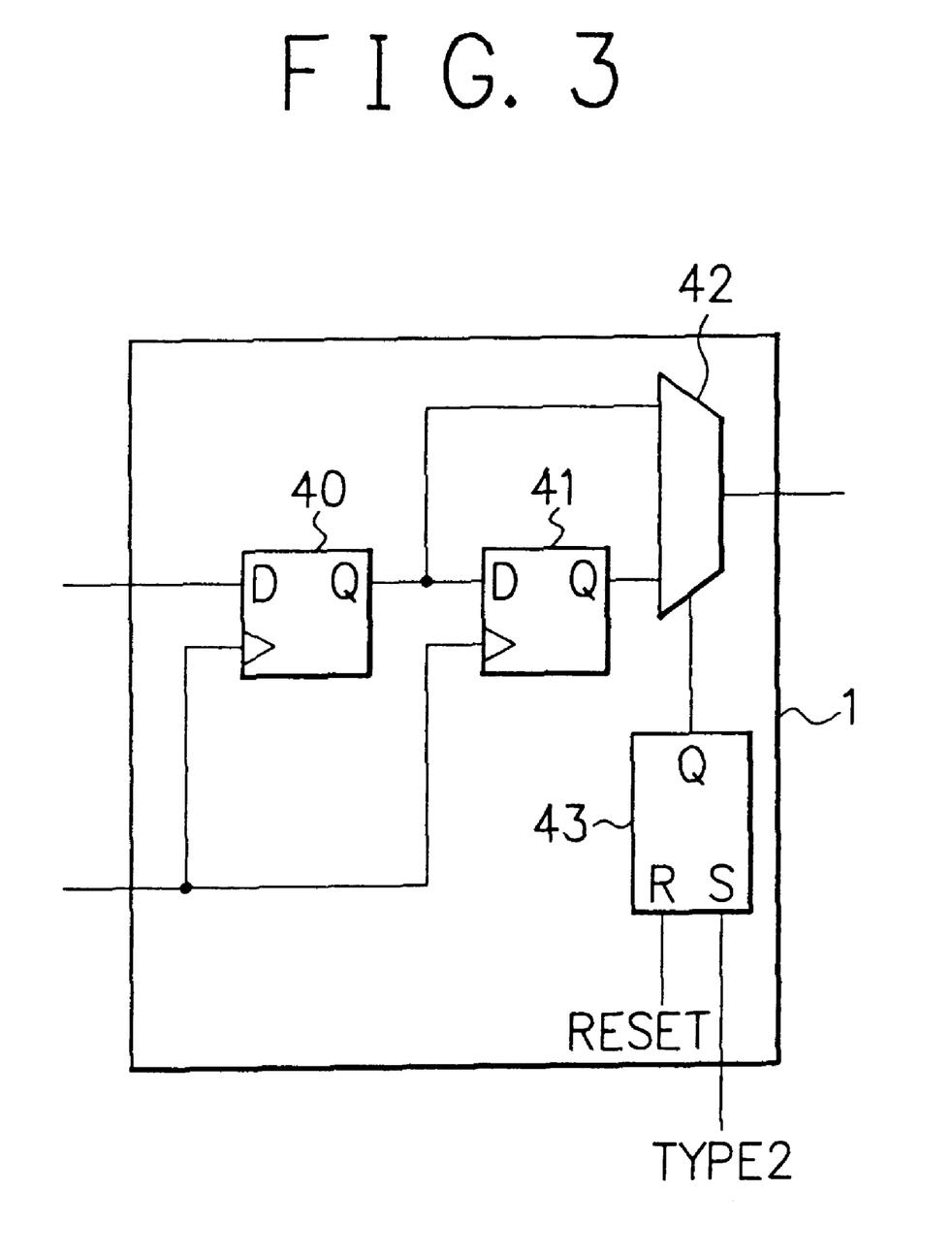
FIG. 3 is a view showing detailed constitution example of one bit delay circuit of the present embodiment.

FIG. 3 is a block diagram showing a configuration example of the 1-bit delay circuit. The 1-bit delay circuit 1 consists of a first and a second D-type flip-flop D-F/F 40, 41, RS flip-flop RS-F/F 43 and a selector 42. The STM-N data is inputted to the first D-F/F 40 to be transmitted to the second D-F/F 41 by the STM-N clock. When the RS-F/F 43 is of the reset state, the selector 42 performs selective outputting for output of the D-F/F 40, when the Type 2 signal comes to be ON, the RS-F/F 43 comes to be set state, subsequently, the selector 42 performs selective outputting of output signal of the D-F/F 40. Under this state, the Type 2 signal comes to be ON, the STM-N signal with 1-bit -delay is outputted in relation to the output of the D-F/F 40.

The first shift register 4 and the second shift register 7, to which the STM-N signal from the 1-bit delay circuit 1 is inputted alternately in every bit unit due to the clock which is generated in such a way that the clock signal (STM-N clock) from the frequency division circuit 2 is subjected to ½-frequency division, shift the STM-N signal.

The A1-byte detecting circuit 6 monitors the output signal of respective shift registers 4, and 7, when the A1-byte is detected, the A1-byte detecting circuit 6 outputs the Type 1 signal and the Type 2 signal in answer to the phase of pattern of the detected A1-byte.

The 2-bit counter circuit 3 implements the count (¼ frequency division) of 2-bit, to output 1-clock in every 8-clock of the clock signal. Further in this operation, when inputting ON-state of the Type 1 signal from the A1-byte detecting circuit 6, it is capable of setting count value of the counter to set value "2", thus the 2-bit counter circuit 3 is constituted such that it is capable of controlling the phase of clock output of the counter.

The first latched-circuit 5 and the second latched-circuit 8 latch the respective outputs of the first and the second shift registers 4, and 7 by using the clock output of the 2-bit counter circuit 3 to output the STM-N data with the 1-byte unit.

Figure 4:
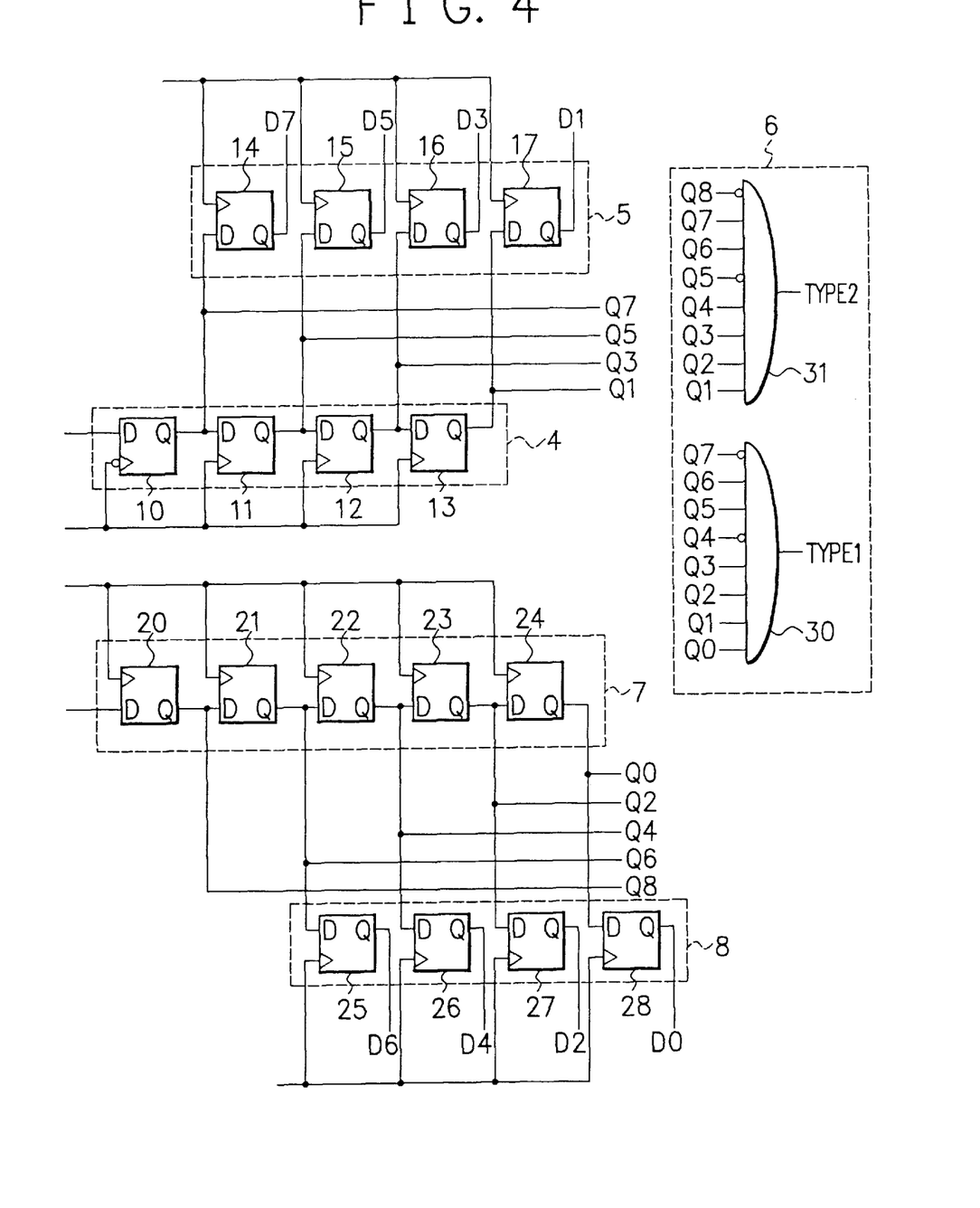
FIG. 4 is a view showing detailed constitution example of a shift register, a latched-circuit and A1-byte detection circuit of the present embodiment.

FIG. 4 is a block diagram showing configuration example of the first and the second shift registers 4, and 7, the first and the second latched-circuits 5, and 8, and the A1-byte detecting circuit 6 in the present embodiment.

The first shift register 4 comprises a master/slave/master (MSM) type D-F/F 10 of the initial stage and D-F/Fs 11–13 of the subsequent second stage. The output signal of the 1-bit delay circuit 1 is latched on alternate bits by the trailing edge of ½ frequency division clock to the MSM type D-F/F 10. The signal latched by the MSM type D-F/F 10 is latched to the D-F/F 11 of the second stage with the timing of the first leading edge after the trailing edge of the ½ frequency division clock. The D-F/Fs 12–13 of the subsequent third stage latches the signal of the prior stage in order with the timing of the leading edge of the clock, thus the signal is sent to after stage. The second shift register 7 comprises the D-F/Fs 21–24. The output signal of the 1-bit delay circuit 1 is latched on alter bits with the leading edge of the ½ frequency division clock by the D-F/F 20, similarly, the output signal is latched the D-F/F 21–24 of the after stage in order to be sent. The respective shift registers 4, and 7 output the output Q0–Q7 and Q1–Q8 to the A1-byte detecting circuit 6.

The first latched-circuit 5 is constituted from the D-F/F 14–17 for inputting the output of the first shift register 4 in parallel, thus latching the output of the first shift register 4 with the timing of the two bit counter circuit 3. Similarly, the second latched-circuit 8 is constituted from the D-F/F 25–28 for inputting the output of the second shift register 7 in parallel, thus latching the output of the D-F/F 21–24 of the second shift register 7.

The A1-byte detecting circuit 6 is constituted from two pieces of AND gates 30 and 31, thus monitoring respective bit patterns of 1-byte data Q0–Q7 and Q1–Q8 which are shifted by 1 bit from the output of the first shift register 4 and the second shift register 7. When the A1-byte is detected in the 8-bits (1 byte) output Q0–Q7, the Type 1 signal becomes ON, while when the A1-byte is detected in the 8-bits (1 byte) output Q1–Q8, the Type 2 signal becomes ON.

As proved in FIG. 4, the first and the second latched-circuit 5, and 8 which input/output byte unit data are connected to the outputs Q0–Q7 of the shift registers 4, and 7, since it is required that whose synchronization is established such that it causes the 1-byte output to operate with the timing (phase) in conformity with 1-byte of the STM-N signal, the clock timing when the Type 1 signal becomes ON, becomes the correct synchronous timing.

On the other hand, when the Type 2 signal becomes ON, the 1-byte output is shifted by 1-byte of the STM-N signal, accordingly, if the Type 2 signal becomes ON, the 1-bit delay circuit causes the output STM-N to be delayed by 1-bit by controlling the 1-bit delay circuit, further depending on the switching over the distribution order of the bit string to the shift registers 4, and 7, before it causes the Type 1 signal to become ON.

Further, since it is correct data which is 8-bits (1-byte) unit following immediately after the Type 1 signal which comes to be ON state, in this ON timing, 2-bits counter value is set to "2", thus the counter outputs the clock signal therefrom in every 4 counts (in every after 8 bits), latching the outputs Q0–Q8 of the shift register to the first and the second latched-circuits 5, and 8.

Figure 5:
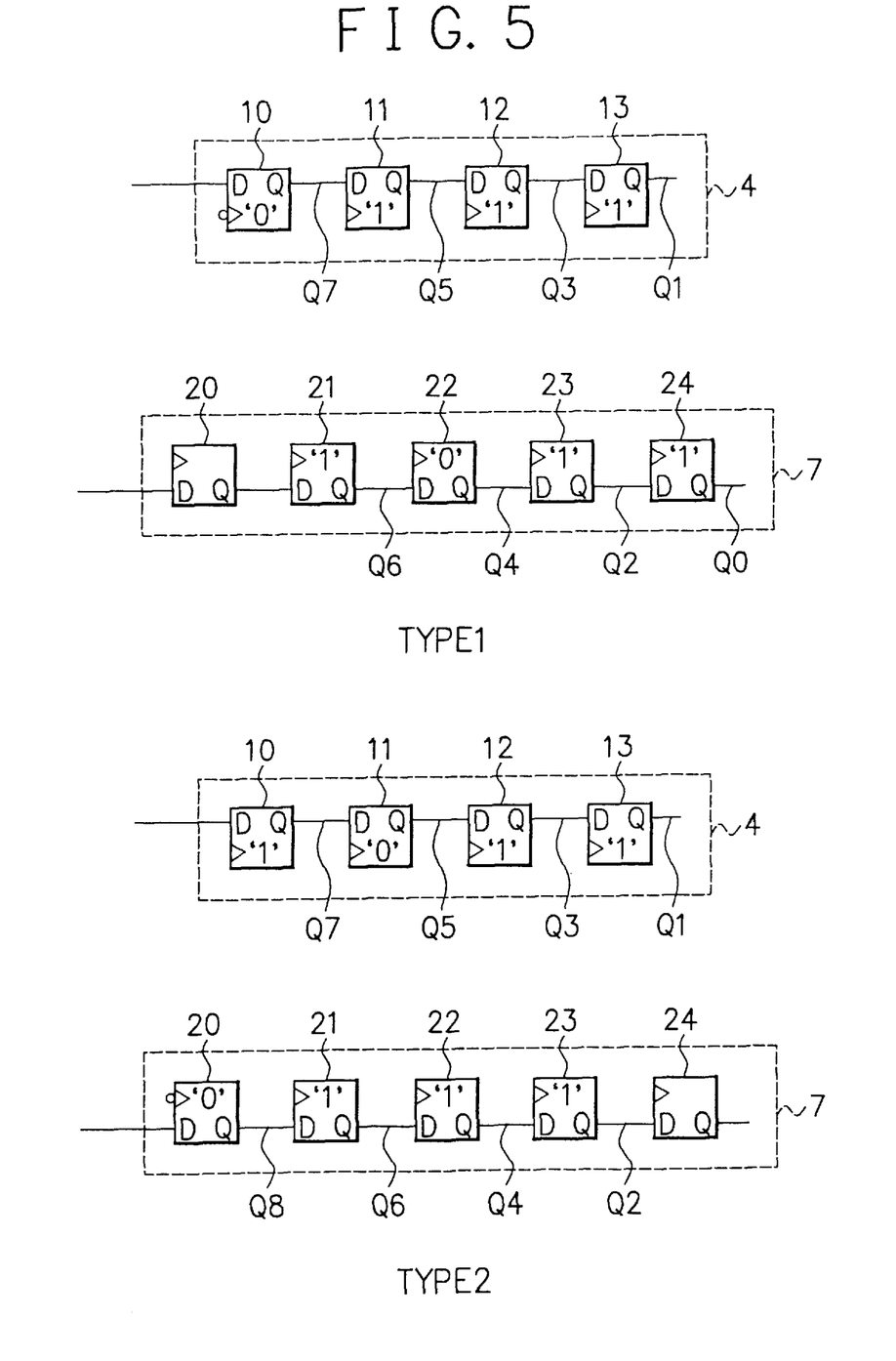
FIG. 5 is a block diagram showing pattern of the A1-byte in the first and the second shift register.

Above operation will be described concretely referring to FIGS. 5 and 6. FIG. 5 shows appearance pattern of the A1-byte in the first and the second shift registers 4, and 7. The first and the second shift registers 4, and 7 consist of the aggregate of 9 stages of D-F/Fs (10–13 and 20–24) in terms of 1-byte (8 bits) of the STM-N signal, thus on the 9 stages of the D-F/Fs, either A1-byte pattern of the Type 1 or A1-byte pattern of the Type 2 is generated. Namely, the A1-byte of the 8-bits pattern "11110110" is detected at either output position (Q0–Q7) or output position (Q1–Q2) which is shifted by 1 bit the output position (Q0–Q7).

The A1-byte detecting circuit 6 comprises an AND gate 30 for detecting the A1-byte of the Type 1 generating at the correct output position (Q0–Q7), and an AND gate 31 for detecting the A1-byte of the Type 2 of 1-bit shifted output position of Q1–Q8 caused by the reversal of input order of bit string toward the first and the second shift registers 4, and 7.

Figure 6:
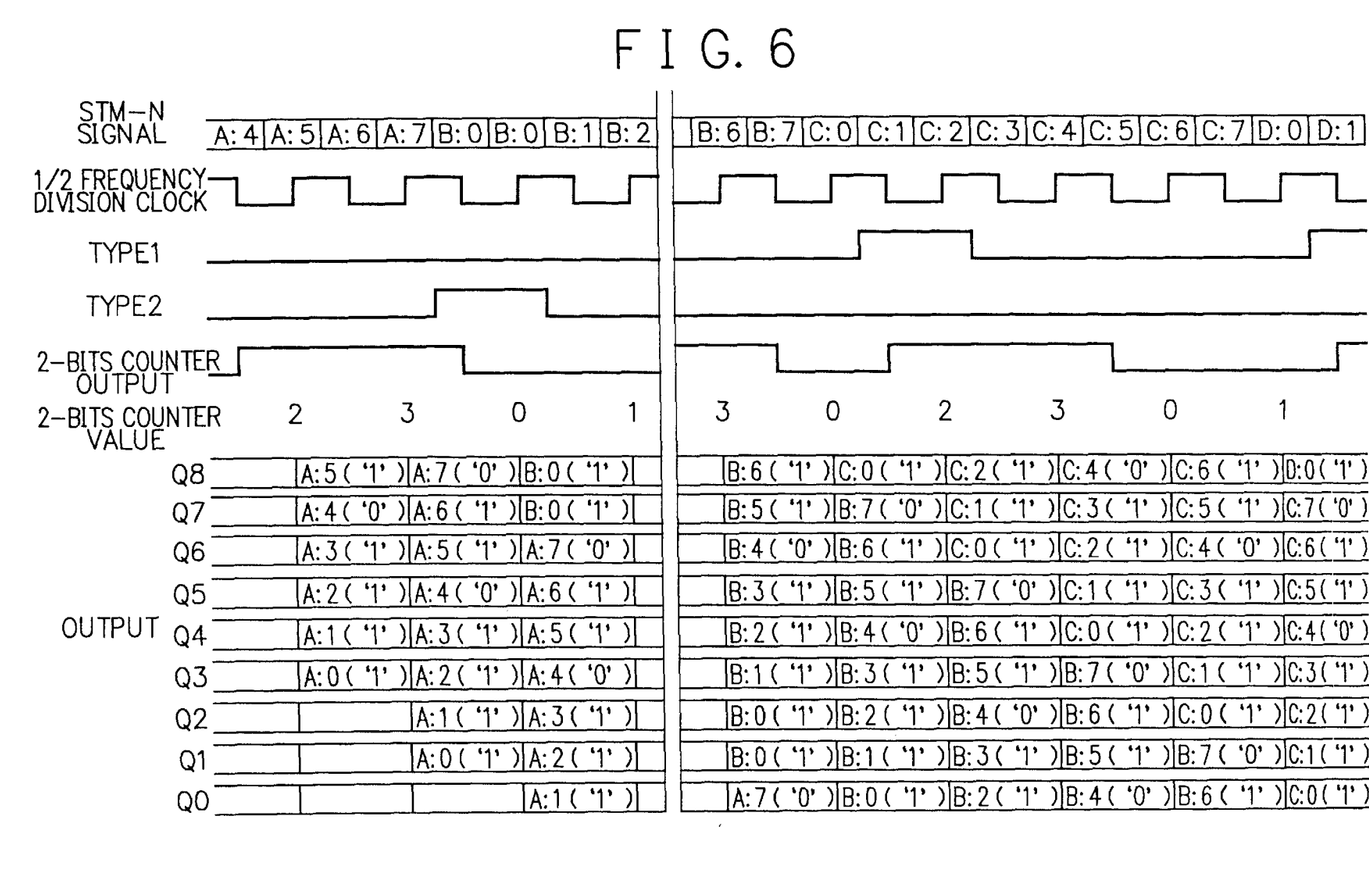
FIG. 6 is a block diagram showing operation of the present embodiment.

FIG. 6 is a view showing time chart of input STM-N signal and so forth and input data pattern of the first and the second shift registers and so forth. Referring to FIG. 6, the input STM-N signal and the outputs Q0–Q8 denote the bit string of STM-N signal shown by byte unit (A, B, C, D . . . ) and transition of bit of respective stages of the shift registers 4, and 7 respectively. Further, the 2-bits counter value denotes the count value of ½ frequency division clock.

The AND gate 31 of the A1-byte detecting circuit 6, as described above, when the bit pattern of output Q1–Q8 comes to be "11110110", detects it to take the Type 2 signal to be ON. When the Type 2 signal comes to be ON, thus causing output data of the 1-bit delay circuit 1 to be delayed. As a result, the same data bit as just before 1-bit delay is inputted again immediately after the Type 2 signal comes to be ON state. This is shown by way of the same bit "B:0" of the STM-N signal in FIG. 6.

When the STM-N signal delays by 1-bit to be increased the data string by 1-bit consequently, the input order of the data to the first and the second shift registers 4, and 7 comes to be reversed accordingly, as found by FIG. 5, if some bits elapse, correct A1-byte comes to be detected from the AND gate 30, at this time the Type 1 signal comes to be ON. At the time when the Type 1 signal is outputted, value of the 2-bits counter circuit 3 is set to "2", thus determining the timing (phase) of output. The 2-bit s counter circuit 3, when the count value is changed from "1" to "2", outputs clock signal to latch to the first and the second latched circuits 5, and 8. The first and the second latched circuits 5, and 8 latch output of the first and the second shift registers 4, and 7 by the clock signal to output data of byte unit. Subsequently, the STM-N signal with correct input order is inputted to the first and the second shift registers 4, and 7 due to output of the 2-bit s counter circuit 3, thus the STM-N byte signal in which phase of byte unit is complete is outputted from the first and the second latched circuit 5, and 8.

Figure 7:
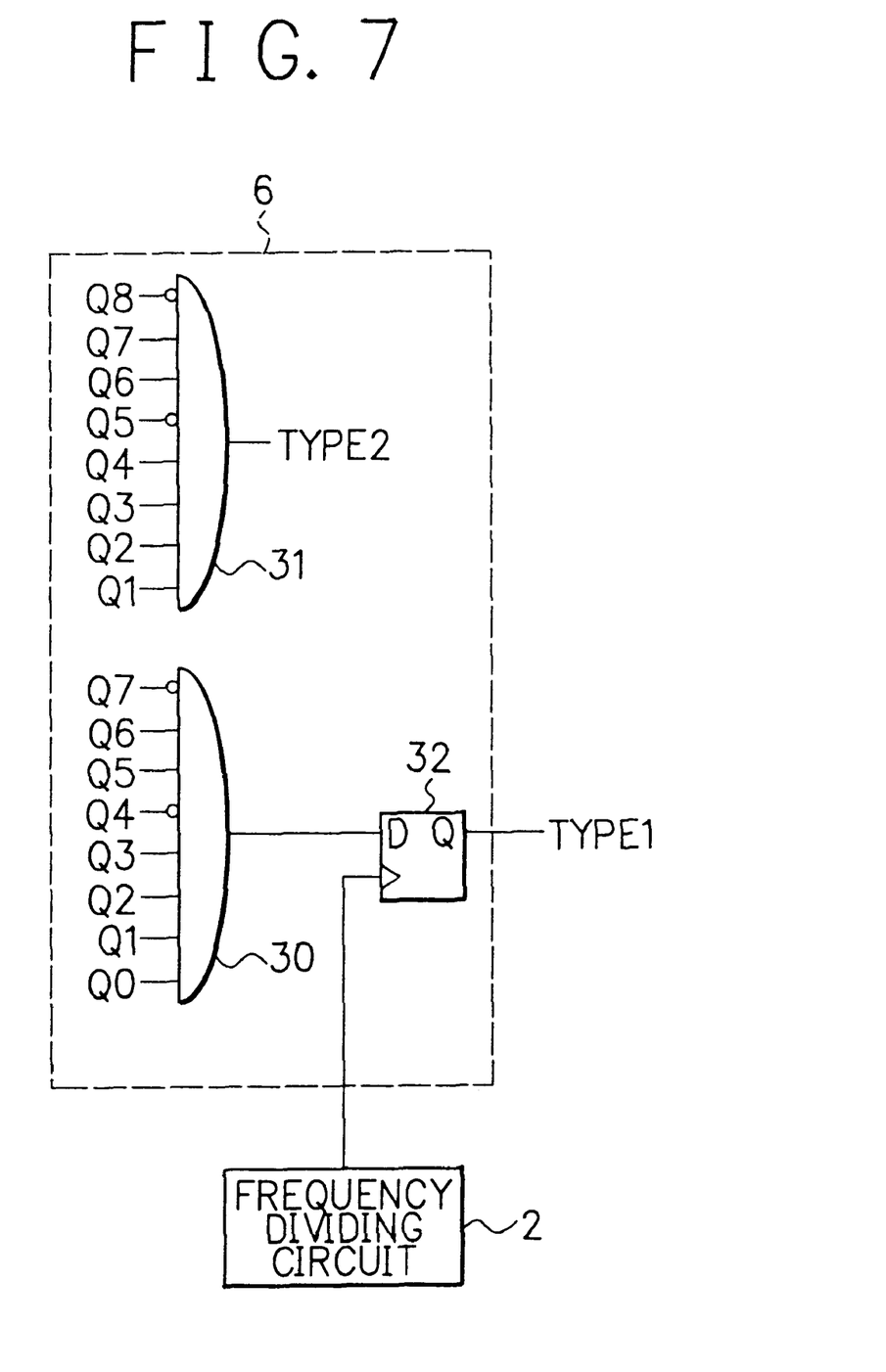
FIG. 7 is a block diagram showing another embodiment of the present invention.

Next, FIG. 7 is a view showing another embodiment which enables high speed operation to be performed in the present invention.

The present embodiment provides improved configuration of the output circuit of the Type 1 signal of the A1-byte detecting circuit 6. It is difficult to execute timing design and so forth in terms of the configuration for setting the set value of the 2-bits counter circuit 3 directly due to output of the AND gate 30 for detecting A1-byte. Consequently in the present embodiment, which causes a D-F/F 32 to be inserted to the output section of the AND gate 30, and which causes ON output of the Type 1 signal to be latched once to the D-F/F 32 which operates due to the ½ frequency division clock to be outputted. By virtue of this configuration, the timing which sets the value of the 2-bits counter circuit 3 is determined by the ½ frequency division clock, consequently, timing design becomes simple and it is capable of coping with the high speed operation. Thus it is capable of realizing the preferred frame synchronization in relation to the signal of high speed STM-64.

As described above, according to the present invention, the parallel shift register enables time of timing operation for synchronous establishment to be ensured. Namely, synchronous detection and establishment of control timing of the counter circuit are capable of being simplified and the frame synchronous circuit which operates stably in high speed is capable of being constituted.

Thus, it is capable of constituting the frame synchronous circuit in which synchronization is established using not many hardware in high speed SDH signal such as STM-64.

The stable synchronous establishment in relation to the signal until the STM-16 will be realized and it is capable of keeping power consumption below 1.5 W, if the SDH synchronous circuit is constituted by the present invention.

While preferred embodiments of the invention have been described using specific terms, such description is for illustrative purpose only, and it is to be understood that changes and variations may be made without departing from the spirit or scope of the following claims.

What is claimed is:

1. A frame synchronous circuit comprising:
    a first and a second shift registers for inputting an SDH (Synchronous Digital Hierarchy) signal alternately in every 1 bit;
    a first and a second A1-byte detecting logic device for detecting an A1-byte from respective inputs which are inputted thereto by way of two sets of outputs for 1 byte which are shifted with each other by 1 bit, from among respective outputs of said first and said second shift registers;
    a latched-circuit for latching to output data with 1 byte as a unit from output of said first and said second shift registers while synchronizing with detected output of said first A1-byte detecting logic device; and
    a switching circuit for switching data input order of said SDH signal inputted to said first and said second shift registers by virtue of detected output of said second A1-byte detecting logic device.

2. A frame synchronous circuit as claimed in claim 1, wherein said switching circuit comprises 1-bit shift circuit for performing 1-bit shift of said SDH signal of detected output of said second A1-byte detecting logic device.

3. A frame synchronous circuit as claimed in claim 1, wherein there is provided a counter circuit for controlling latching of said latched-circuit by 1-byte cycle of said SDH signal with detected output of said first A1-byte detecting logic device as set input of determined value.

4. A frame synchronous circuit comprising:
    a delay circuit which is capable of outputting data slowed by 1-bit in relation to input data by selection signal;
    a frequency division circuit for frequency dividing input clock by ½;
    a first and a second shift register circuits for shifting data successively by using frequency division clock signal of said frequency dividing circuit while inputting output signal of said delay circuit;
    a counter circuit for performing counter operation by inputting frequency division clock signal of said frequency dividing circuit and said counter circuit which is capable of setting the counter to a determined value by virtue of set signal;
    an A1-byte detecting circuit to which data of determined bit number shifted from output of said first and said second shift registers by 1-bit each other is inputted, detecting the A1-byte of the SDH (Synchronous Digital Hierarchy) frame, and outputting respective detected outputs by way of selection signal of said delay circuit and set signal of said counter circuit; and
    a first and a second latched-circuit to which the output of said first and said second shift registers is inputted to perform latching by the output signal of said counter circuit.

5. A frame synchronous circuit as claimed in claim 4, wherein said first shift register comprises a first flip-flop for latching an input data at trailing edge of a frequency division clock signal and for maintaining signal from the time point of latching until leading edge of next frequency division clock signal; and a second to a fourth flip-flops for latching an input data at leading edge of a frequency division clock signal and for maintaining data from the time point of latching until next leading edge of the frequency division clock signal, and wherein said second shift register comprises a first to a fifth flip-flops for latching input data at leading edge of the frequency division clock signal and for maintaining data from the time point of latching until next leading edge of the frequency division clock signal.

6. A frame synchronous circuit as claimed in claim 5, wherein said A1-byte detecting circuit comprises a first logic gate circuit for outputting said selection signal with both outputs of said first to fourth flip-flops of said first shift register and said first to fourth flip-flops of said second shift register as input, and a second logic gate circuit for outputting said set signal with both outputs of said first to fourth flip-flops of said first shift register and said second to fifth flip-flops of said second shift register as input.

7. A frame synchronous circuit as claimed in claim 4, wherein said delay circuit comprises a first flip-flop for implementing latching with clock signal of SDH while inputting said SDH signal, a second flip-flop for implementing latching with said clock signal while inputting the output signal of said first flip-flop, a flip-flop whose output becomes always ON when selection signal is once inputted, and a selector circuit for selecting to output either output signal of said first flip-flop or output signal of said second flip-flop.

8. A frame synchronous circuit as claimed in claim 6, wherein said A1-byte detecting circuit comprises a flip-flop for implementing latching of output of said second logic gate circuit by frequency division clock signal of said frequency dividing circuit.

9. A data processing method of a frame synchronous circuit comprising the steps of:

inputting an SDH (Synchronous Digital Hierarchy) signal alternately in every 1 bit;

detecting an A1-byte from respective inputs which are inputted by way of two sets of outputs for 1 byte which are shifted with each other by 1 bit, from among respective outputs;

latching to output data with 1 byte as a unit from output while synchronizing with detected output of a first A1-byte detecting logic device; and switching data input order of said SDH signal inputted to a first and a second shift registers by virtue of detected output of a second A1-byte detecting logic device.

10. A data processing method of a frame synchronous circuit comprising the steps of:

outputting data slowed by 1-bit in relation to input data by selection signal;

frequency-dividing input clock by ½;

shifting data successively by using frequency division clock signal of said frequency dividing circuit while inputting output signal of said delay circuit;

performing counter operation by inputting frequency division clock signal of a frequency dividing circuit and a counter circuit which is capable of setting the counter to a determined value by virtue of set signal;

inputting data of determined bit number shifted from output of a first and a second shift registers by 1-bit each other, detecting the A1-byte of the SDH (Synchronous Digital Hierarchy) frame, and outputting respective detected outputs by way of selection signal of said delay circuit and set signal of said counter circuit; and inputting the output of said first and said second shift registers to perform latching by the output signal of a counter circuit.

* * * * *